US008943272B2

United States Patent
Bell, Jr. et al.

(10) Patent No.: US 8,943,272 B2
(45) Date of Patent: *Jan. 27, 2015

(54) VARIABLE CACHE LINE SIZE MANAGEMENT

(75) Inventors: Robert H. Bell, Jr., Austin, TX (US); Wen-Tzer T. Chen, Austin, TX (US); Diane G. Flemming, Pflugerville, TX (US); Hong L. Hua, Austin, TX (US); William A. Maron, Austin, TX (US); Mysore S. Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,742

(22) Filed: Apr. 20, 2012

(65) Prior Publication Data

US 2013/0111136 A1 May 2, 2013

Related U.S. Application Data

(63) Continuation of application No. 13/286,507, filed on Nov. 1, 2011.

(51) Int. Cl.
*G06F 12/00* (2006.01)
*G06F 12/08* (2006.01)

(52) U.S. Cl.
CPC ............ *G06F 12/08* (2013.01); *G06F 12/0897* (2013.01); *G06F 12/0811* (2013.01)
USPC ........... 711/122; 711/144; 711/143; 711/133; 711/119; 711/E21.043

(58) Field of Classification Search
CPC ............ G06F 12/0897; G06F 12/0811; G06F 12/0804; G06F 12/12
See application file for complete search history.

(56) References Cited

U.S. PATENT DOCUMENTS

| 6,370,618 | B1 | 4/2002 | Arimilli et al. | |
|---|---|---|---|---|
| 7,254,681 | B2 | 8/2007 | Lai | |
| 7,380,047 | B2 | 5/2008 | Emma et al. | |
| 7,996,622 | B1 | 8/2011 | Toksvig et al. | |
| 2004/0103251 | A1* | 5/2004 | Alsup | 711/122 |
| 2005/0278486 | A1* | 12/2005 | Trika et al. | 711/142 |
| 2006/0184745 | A1* | 8/2006 | Tan | 711/143 |
| 2009/0106496 | A1* | 4/2009 | Knebel | 711/136 |
| 2010/0023695 | A1 | 1/2010 | Guthrie et al. | |
| 2010/0235584 | A1 | 9/2010 | Guthrie et al. | |

OTHER PUBLICATIONS

Inoue et al.; Dynamically Variable Line-Size Cache Exploiting High On-Chip Memory Bandwidth of Merged DRAM/Logic LSIs; HPCA Proceedings of the 5th International Symposium on High Performance Computer Architecture; 1999; pp. 218-222.

* cited by examiner

*Primary Examiner* — Aimee Li
*Assistant Examiner* — Arvind Talukdar
(74) *Attorney, Agent, or Firm* — James L. Baudino

(57) ABSTRACT

According to one aspect of the present disclosure, a method and technique for variable cache line size management is disclosed. The method includes: determining whether an eviction of a cache line from an upper level sectored cache to an unsectored lower level cache is to be performed, wherein the upper level cache includes a plurality of sub-sectors, each sub-sector having a cache line size corresponding to a cache line size of the lower level cache; responsive to determining that an eviction is to be performed, identifying referenced sub-sectors of the cache line to be evicted; invalidating unreferenced sub-sectors of the cache line to be evicted; and storing the referenced sub-sectors in the lower level cache.

12 Claims, 4 Drawing Sheets

VARIABLE CACHE LINE SIZE MANAGEMENT

BACKGROUND

Computer or data processing systems utilize various methods to increase the speed of data processing. One such technique is the utilization of a memory hierarchy design. For example, computer memory systems often include different levels of memory such as a fast cache memory structure along with a slower main memory. If a request for data is found in a cache memory structure (a cache "hit"), the time penalty associated with retrieving the requested data from main system memory is avoided. However, cache space is a valuable commodity. For example, the larger the cache memory size, the more real estate of the chip the cache requires as well as increased power demand.

BRIEF SUMMARY

According to one aspect of the present disclosure a method and technique for variable cache line size management is disclosed. The method includes: determining whether an eviction of a cache line from an upper level sectored cache to an unsectored lower level cache is to be performed, wherein the upper level cache includes a plurality of sub-sectors, each sub-sector having a cache line size corresponding to a cache line size of the lower level cache; responsive to determining that an eviction is to be performed, identifying referenced sub-sectors of the cache line to be evicted; invalidating unreferenced sub-sectors of the cache line to be evicted; and storing the referenced sub-sectors in the lower level cache.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
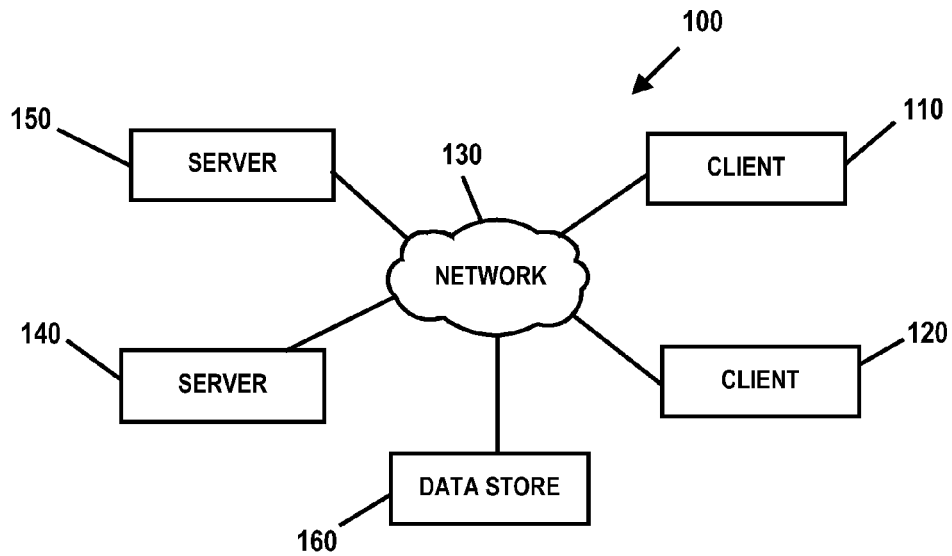
FIG. 1 is an embodiment of a network of data processing systems in which the illustrative embodiments of the present disclosure may be implemented.

Embodiments of the present disclosure provide a method, system and computer program product for variable cache line size management. For example, in some embodiments, the method and technique includes: determining whether an eviction of a cache line from an upper level sectored cache to an unsectored lower level cache is to be performed, wherein the upper level cache includes a plurality of sub-sectors, each sub-sector having a cache line size corresponding to a cache line size of the lower level cache; responsive to determining that an eviction is to be performed, identifying referenced sub-sectors of the cache line to be evicted; invalidating unreferenced sub-sectors of the cache line to be evicted; and storing the referenced sub-sectors in the lower level cache. Thus, in some embodiments of the present disclosure, an upper level cache line is divided into sub-lines or sub-sectors that correspond in size to a cache line size of a lower level cache. If an upper level cache line is to be evicted from the upper level cache, the referenced portions or sub-sectors of the upper level cache line are written to the lower level cache while the unreferenced upper level cache line portion or sub-sectors are invalidated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
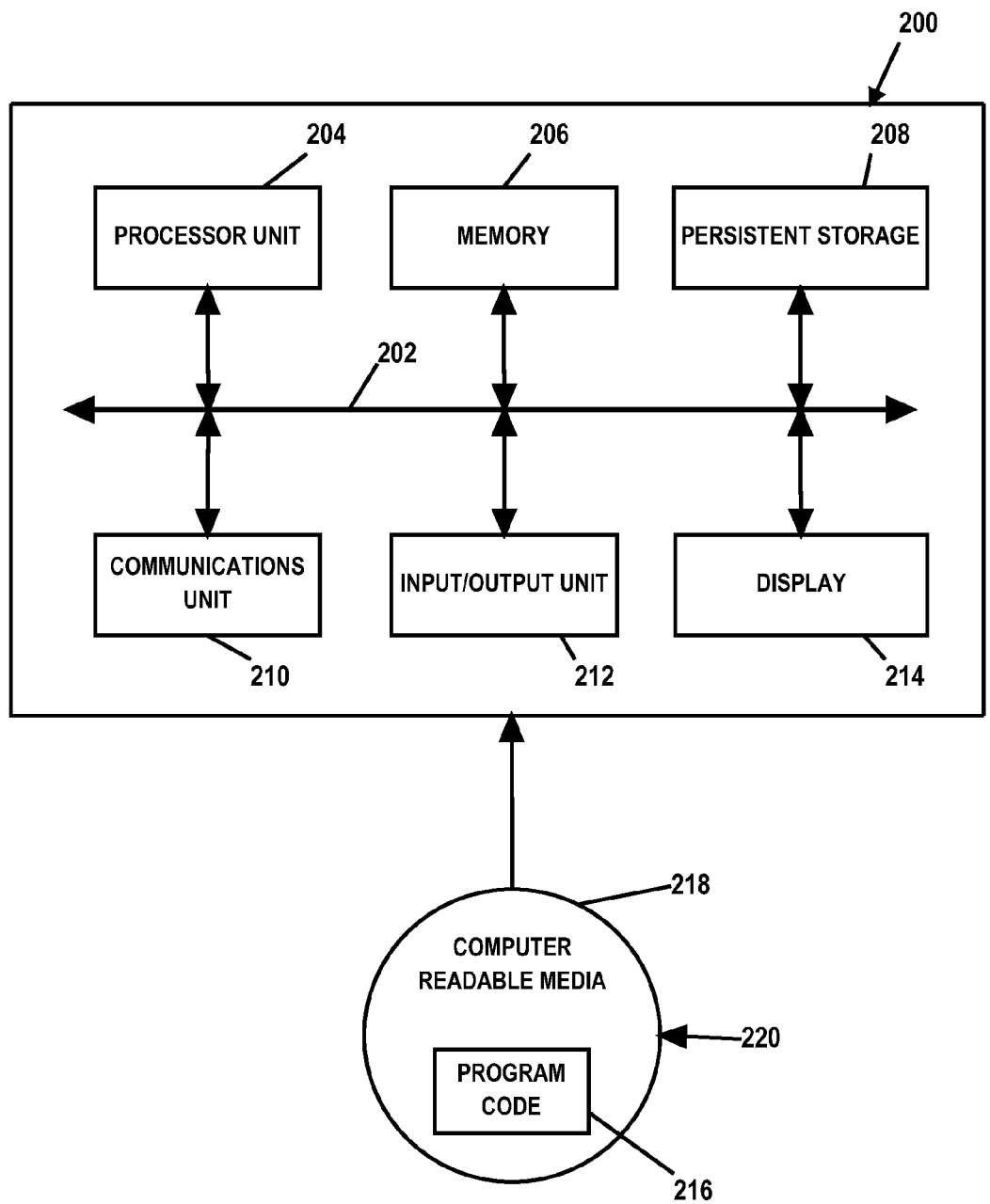
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a variable cache line size management system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
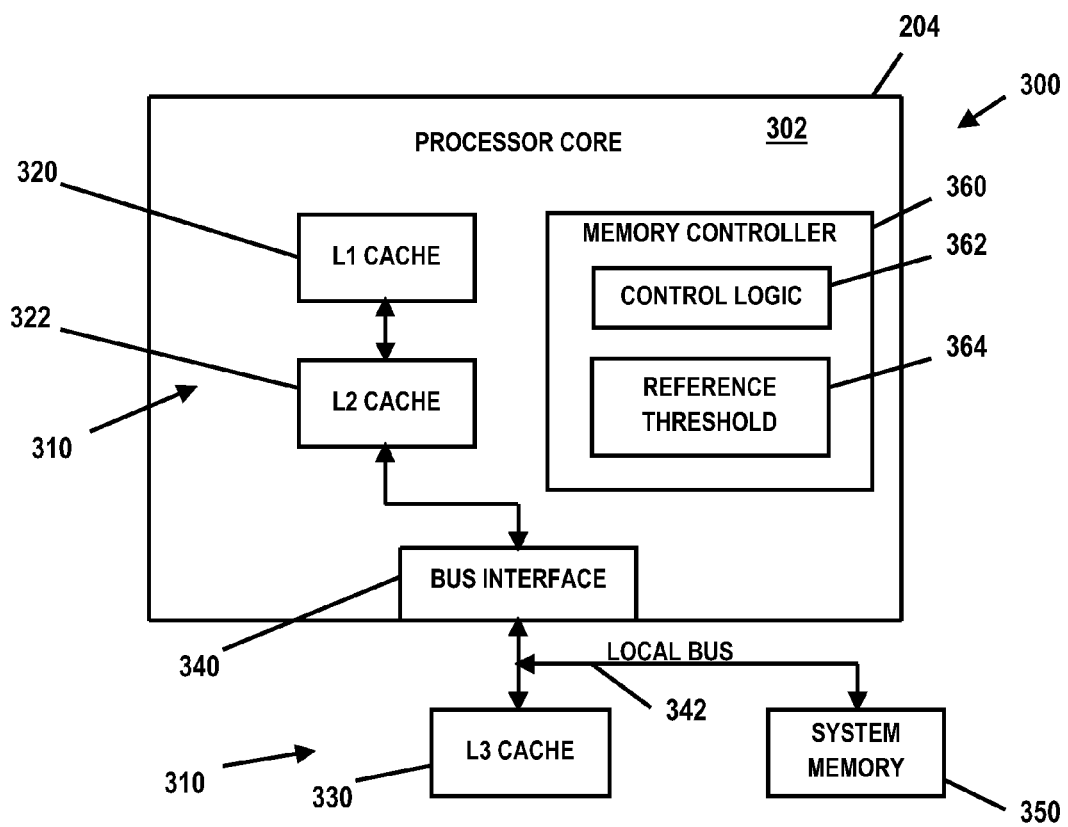
FIG. 3 is a diagram illustrating an embodiment of a data processing system for variable cache line size management in which illustrative embodiments of the present disclosure may be implemented.

FIG. 3 is an illustrative embodiment of a system 300 for variable cache line size management. System 300 may be implemented on data processing systems or platforms such as, but not limited to, servers 140 and/or 150, clients 110 and/or 120, or at other data processing system locations. For example, in the embodiment illustrated in FIG. 3, system 300 comprises processor unit 204 having one or more instances of a processor core 302 and a cache hierarchy 310 coupled to processor core 302. It should be understood that processor core 302 may include other units not illustrated in FIG. 3 such as, but not limited to, a prefetch unit, arithmetic logic units, etc. In the illustrated embodiment, cache hierarchy 310 includes a level one (L1) cache 320 and a level two (L2) cache 322 in processor core 302, and a level three (L3) cache 330. The quantity and location of the various levels of cache of cache hierarchy 310, as well as the quantity of cache structures at a particular level, may vary (e.g., a single cache level within core 302 with multiple cache levels outside core 302, etc.). As used herein an "upper level" cache and a "lower level" cache corresponds to the cache position in the hierarchy. For example, in the embodiment illustrated in FIG. 3, L1 cache 320 is an upper level cache to lower level L2 cache 322, and L2 cache 322 is an upper level cache to lower level L3 cache 330.

L1 cache 320 is used to store data that is operated on by processor unit 204. L1 cache 320 is coupled to L2 cache 322. Requests for data cause read requests to L1 cache 320. If data is not present in L1 cache 320 (a cache miss), a read request will be issued to L2 cache 322. Likewise, if the data is not present in L2 cache 322, a read request will be issued through bus interface 340 and carried on a local bus 342 to L3 cache 330. Similarly, if data is not present in L3 cache 330, a read request will be issued to a system memory 350.

When a read request is satisfied, a storage location in a cache is selected to store the read data. In some instances, all of the cache entries of a particular cache structure may be in use or are full. Typically, when a cache becomes full, a cache line is removed ("evicted") and written or stored to a lower level cache or to system memory 350. Similarly, if a read request is satisfied from a lower level cache, the read data may be written to or stored in an upper level cache. In FIG. 3, processor core 302 includes a memory controller 360 that may control read and write access to one of more system 300 memories, such as cache hierarchy 310 and system memory 350. Memory controller 360 may be implemented in any suitable manner using known techniques that may be hardware-based, software-based, or some combination of both. For example, memory controller 360 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). In the embodiment illustrated in FIG. 3, memory controller 360 includes control logic 362 for performing various functions and/or operations corresponding to cache hierarchy 310. For example, as will be described in further detail below, control logic 362 may monitor references to data stored in caches (e.g., a least-recently used (LRU) mechanism or most-recently used (MRU) mechanism), store a reference count corresponding to such references, compare the reference counts to a reference count threshold value 364, invalidate cache data, and select certain cache data for eviction to a lower level cache.

Figure 4:
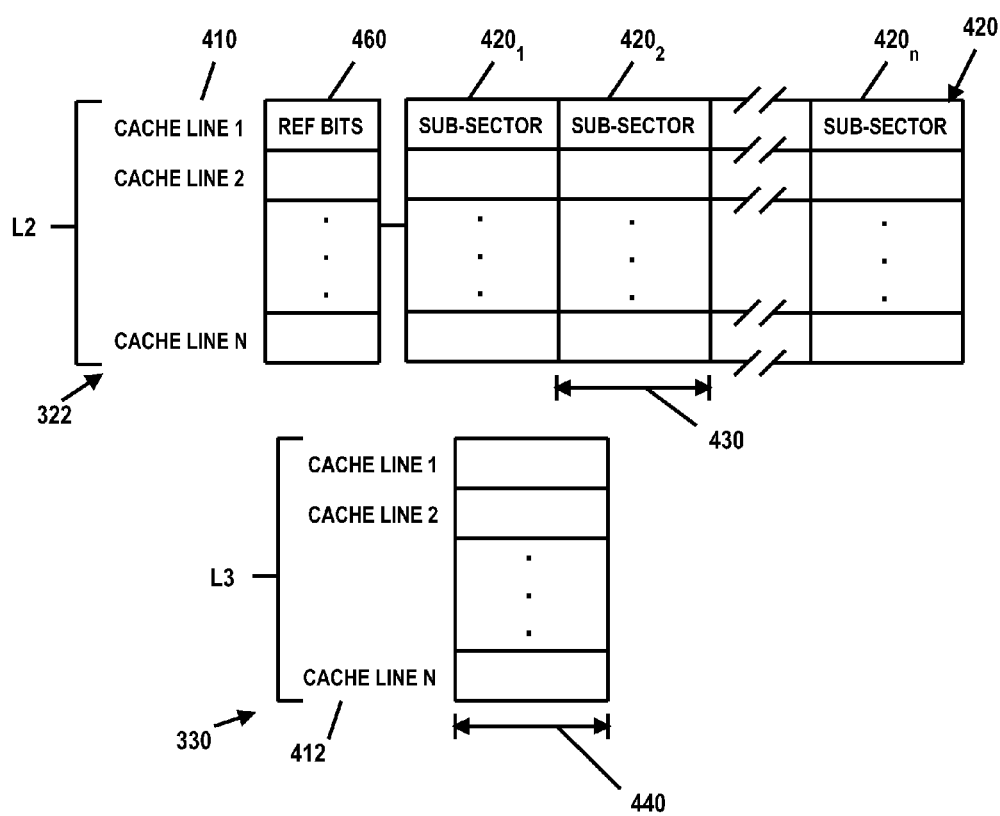
FIG. 4 is a diagram illustrating a cache hierarchy for variable cache line size management in which illustrative embodiments of the present disclosure may be implemented.

FIG. 4 is a diagram illustrating a portion of cache hierarchy 310 illustrated in FIG. 3. In FIG. 4, L2 cache 322 and L3 cache 330 are illustrated; however, it should be understood that embodiments of the present disclosure may be applied to other levels of a cache hierarchy. In the illustrated embodiment, L2 cache 322 and L3 cache 330 will be described using an exclusive implementation (i.e., that given data is not held concurrently by different cache levels); however, it should be understood that embodiments of the present disclosure may be implements in a nonexclusive caching system. In FIG. 4, L2 cache 322 will be referred to as the upper level cache, and L3 cache 330 will be referred to as the lower level cache. As illustrated in FIG. 4, caches 322 and 330 each include a number of entries or cache lines 410 and 412, respectively. Each cache line 410 and 412 may be indexed by a respective address.

In the embodiment illustrated in FIG. 4, upper level L2 cache 322 comprises a sectored cache while lower level L3 cache 330 comprises an unsectored cache. For example, in FIG. 4, each cache line 410 of upper level L2 cache 322 includes a plurality of line sub-units or sub-sectors 420 (e.g., $420_{1-n}$). The cache lines 412 of lower level L3 cache 330 are unsectored. In some embodiments, each sub-sector 420 of a cache line 410 of the upper level cache 322 is sized to correspond to a size of the cache line 412 of lower level L3 cache 330. It should be understood that in some embodiments, each sub-sector 420 may be sized smaller than a cache line size of the lower level cache; however, in such embodiments, two or more of such sub-sectors 420 would preferably be sized as a factor of the lower level cache line (i.e., the cache line size of the lower level cache being a multiple of the upper level cache line sub-sector size). Thus, in the illustrative example of FIG. 4, a cache line 410 sub-sector 420 size represented by reference number 430 would be equal to a cache line 412 size of the lower level cache 330, represented by reference number 440. For example, if a cache line size of lower level L3 cache is 64 bytes, upper level L2 cache may be configured with a 128 byte cache lines size with two sub-sectors 420 each with a 64 byte line size.

A data processor system generally maintains a single cache line size throughout the cache hierarchy of the system, and if a system does contain a sectored cache, it is a lower level cache that is sectored and each sector is the same size as a cache line contained in the upper level cache. Sectoring reduces cache directory size for a larger cache, which in turn reduces the silicon cost and the logic complexity of processor systems that are designed to execute workloads that fetch data sequentially, efficiently utilizing a large proportion of the data in the contiguous sectors. As an example, systems with 128 byte cache lines in the upper level L1 cache may be designed with a lower level L2 cache that stores two consecutive cache lines, each of 128 bytes, in each cache location that is managed by a directory entry. Bits in the directory entry give the state of each sector that the directory entry manages. For workloads that exhibit good spatial locality and typically access more than 128 bytes contiguously, system performance can be improved by fetching the full 128 byte cache line into the upper level cache and by fetching or prefetching additional 128 byte sectors into the lower level cache in anticipation of their future use by the workload. However, in the upper level cache that is closest to the processing units, sectoring by doubling up the cache lines would increase the size and complexity of the cache and slow down accesses to the cache.

In contrast, many other types of workloads only use some bytes of a cache line of a particular size. As an example, if the processor cache line size is 128 bytes, a workload may only use 64 bytes or less of any particular cache line that is fetched from memory into the cache hierarchy. This is typical for workloads that exhibit poor spatial locality or more random data accesses. For this type of workload, by partitioning the lower level cache into 64 byte cache lines instead of 128 byte cache lines and by carrying only referenced data, a higher proportion of the data that is cast out from the upper level cache to the lower level cache will be previously referenced data and is more likely to be referenced again by the upper level cache. Since the lower level cache, such as a 32 megabyte L3 cache, is typically orders of magnitude larger than an upper level cache, such as a 32 kilobyte L1 cache, a larger proportion of the data stored in the cache hierarchy becomes referenced data, as measured over the entire capacity of the cache hierarchy; the cache hierarchy then appears to be effectively larger than with an unsectored lower level cache since more of the data that has been stored is useful data. However, any performance increase comes at the cost of a larger directory and additional logic complexity in the lower level cache.

Embodiments of the present invention are configured to process both those workloads that benefit from data fetched or prefetched at the original granularity of one or more cache lines and also those workloads that reference only part of the cache line. The upper level cache maintains the original full operational cache line size, albeit in multiple pieces for each directory entry, which benefits workloads that utilize contiguous bytes of data at the granularity of the original cache line size and supports legacy code performance without much change in upper level cache size or complexity. At the same time, the large lower level cache is implemented at the granularity of the smaller sector, which provides the benefit of an effectively larger overall cache hierarchy as described above.

In operation, control logic 362 (FIG. 3) monitors which sub-sector(s) 420 is referenced in upper level cache 322. In some embodiments, each cache line 410 may include a reference identifier 460 (e.g., a reference bit) identifying which sub-sector(s) 420 is referenced. Reference identifier 460 may be used to determine which sub-sector 420 to evict to a lower level cache and which sub-sector to invalidate. For example, if upper level L2 cache 322 is full, one of the cache lines 410 may need to be evicted. Control logic 362 accesses and/or or otherwise evaluates reference identifier 460 to determine which sub-sector(s) 420 has been referenced such that the referenced sub-sector 420 is selected and evicted or written to a lower level cache while an unreferenced sub-sector 420 is invalidated. In some embodiments, reference identifier 460 may be a single bit that identifies if the line has been written (i.e., modified) and therefore must be evicted to a lower-level cache. In some embodiments, reference identifier 460 may include a counter which counts how many times a sub-sector 420 has been accessed, whether or not it has been modified, but indicates that sub-sector 420 is highly referenced. Thus, embodiments of the present disclosure invalidate the unreferenced or less highly referenced sub-sector(s) 420 of the cache line of the upper level cache such that neither bus bandwidth nor lower level cache space is utilized for unreferenced or less highly used data. Further, embodiments of the present disclosure reduce the cache miss rate of the lower level cache by not replacing recently used data in the lower level cache with data from the upper level cache that was unused, less highly used, or unreferenced. Further, since the size of lower level cache lines 412 correspond to the upper level cache line size of the sub-sectors 420, requested data found in a lower level cache line 412 may be written to a sub-sector 420 of one of the cache lines 410 of the upper level cache.

In some embodiments, as described herein, control logic may monitor and store reference counts corresponding to each sub-sector 420 of a particular cache line 410 of the upper level cache as one or more reference identifiers 460 (e.g., using different bits on the cache line to designate a reference count for certain sub-sectors 420). In operation, in response to determining that a cache line 410 of the upper level cache needs to be evicted, control logic 362 may compare the reference counts corresponding to each sub-sector 420 of the cache line to be evicted against a reference threshold 364 value (FIG. 3). If the reference count for any sub-sector 420 exceeds the reference threshold 364 (or meets or exceeds), the particular sub-sector 420 is selected by control logic 362 to be written to lower level cache 330 while unselected sub-sectors 420 (i.e., those sub-sectors 420 having a reference count that does not exceed reference threshold 364) are invalidated. It should be noted that if the sub-sector 420 has been modified, it must be written to a lower level cache or memory not only because it has been referenced but also to maintain memory coherence. If sub-sector 420 has not been modified but is highly-referenced, as indicated by a reference count exceeding reference threshold 356 (or meets or exceeds), then memory is coherent and, if lower level cache 330 is not exclusive with respect to the upper level cache, the lower level cache 330 may be first checked to see if the sub-sector 420 already exists or still exists in the lower level cache 330. If sub-sector 420 exists in lower level cache 330, it may be invalidated in the upper level cache. If it does not exist, as is true if lower level cache 330 is exclusive with respect to the upper level cache, sub-sector 420 may be written to lower level cache 330.

In some embodiments, control logic 362 may be used to partition the upper level cache with a desired number of sub-sectors 420 based on a cache line size of the lower level cache. For example, if lower level L3 cache 330 is configured with a cache line size of 64 bytes and upper level L2 cache 322 is configured with a cache line size of 256 bytes, control logic 362 may be used to partition cache lines 410 of upper level L2 cache 322 with two sub-sectors 420 each sized at 128 bytes or four sub-sectors 420 each sized at 64 bytes.

Figure 5:
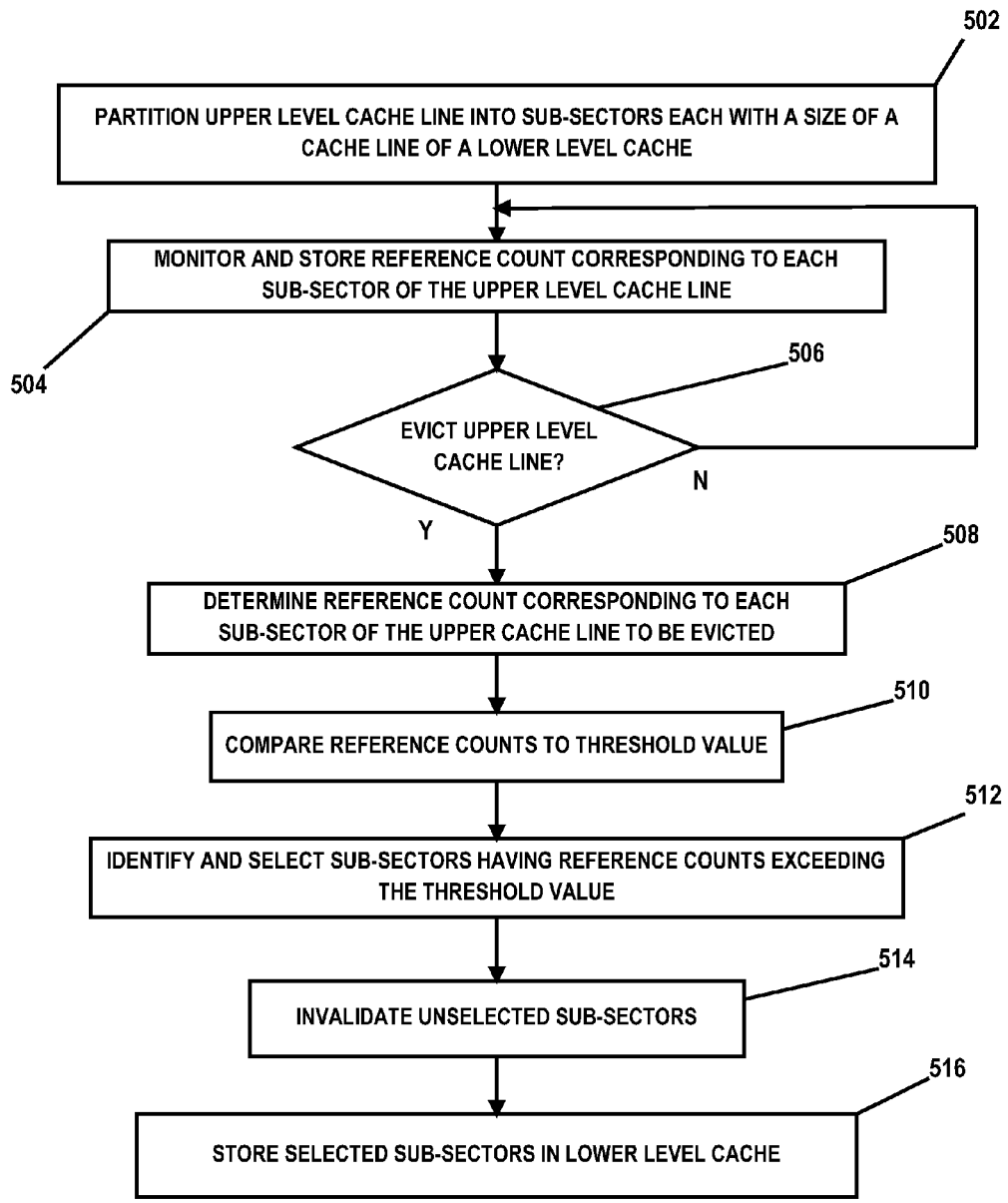
FIG. 5 is a flow diagram illustrating an embodiment of a method for variable cache line size management.

FIG. 5 is a flow diagram illustrating an embodiment of a method for managing a variable cache line size. The method begins at block 502, where control logic 362 may be used to partition an upper level cache (e.g., L2 cache 322) into a plurality of sub-sectors 420 each with a size corresponding to a cache line size of a lower level cache (e.g., L3 cache 330). At block 504, control logic 362 monitors and stores reference counts as reference identifier(s) 460 corresponding to each sub-sector 420 of the upper level cache. At decisional block 506, a determination is made whether an upper level cache line is to be evicted. If not, the method continues to block 504 where control logic 362 continues to monitor and store reference counts for the sub-sectors 420. If an upper level cache line is to be evicted, the method continues to block 508, where control logic 362 determines which sub-sector 420 has been referenced and/or determines a reference count corresponding to one or more sub-sectors 420.

At block 510, control logic 362 compares reference counts 460 to reference threshold 364. As discussed above, in some embodiments, comparison to reference threshold 364 may be omitted such that the method continues to select referenced sub-sectors 420 to write to the lower level cache. At block 512, control logic 362 identifies and selects sub-sector(s) 420 having a reference count exceeding reference threshold 364. At block 514, control logic 362 invalidates unreferenced or unselected sub-sectors 420. At block 516, the referenced or selected sub-sectors 420 are written to the lower level cache.

Thus, embodiments of the present disclosure enable a more efficient cache system that reduces bandwidth requirements and saves lower level cache space. For example, embodiments of the present disclosure evict the referenced portions of an upper level cache line to a lower level cache while invalidating portions of the upper level cache line that are unreferenced. Thus, embodiments of the present disclosure reduce the lower level cache miss rate by avoiding writing unreferenced data to the lower level cache. Further, less data is moved from the upper level cache to the lower level cache, thereby reducing bandwidth requirements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for data processing in a data processing system, comprising:
    determining whether an eviction of a cache line from an upper level cache to a lower level cache is to be performed, wherein the upper level cache comprises a plurality of cache lines each being sectored into a plurality of sub-sectors, and wherein the lower level cache comprises a plurality of cache lines each being unsectored, each sub-sector having a size corresponding to a size of the cache line of the lower level cache;
    responsive to determining that an eviction is to be performed, identifying referenced sub-sectors of the cache line to be evicted;
    invalidating unreferenced sub-sectors of the cache line to be evicted; and
    storing the referenced sub-sectors in the lower level cache.

2. The method of claim 1, further comprising storing an identifier associated with the upper level cache indicating referenced sub-sectors of a cache line of the upper level cache.

3. The method of claim 2, wherein identifying referenced sub-sectors of the cache line to be evicted comprises accessing the stored identifier.

4. The method of claim 1, further comprising:
    responsive to identifying a cache miss in the upper level cache, determining whether requested data resides in the lower level cache; and
    responsive to determining that the requested data resides in the lower level cache, storing at least one cache line of the requested data of the lower level cache in a sub-sector of a cache line of the upper level cache.

5. The method of claim 1, further comprising partitioning the upper level cache into the plurality of sub-sectors wherein each sub-sector is sized to a cache line size of the lower level cache.

6. The method of claim 1, further comprising:
storing a reference count associated with each sub-sector of the upper level cache; and
responsive to determining that an eviction is to be performed from the upper level cache, identifying select sub-sectors to store in the lower level cache based on the reference count associated with each sub-sector of the cache line to be evicted.

7. The method of claim 6, further comprising:
determining the reference count of each sub-sector of a cache line to be evicted from the upper level cache;
comparing the respective reference counts to a threshold value; and
responsive to determining that a particular reference count for a respective sub-sector is greater than the threshold value, storing the respective sub-sector in the lower level cache.

8. A method for variable cache line size management, comprising:
partitioning a cache line of an upper level cache into a plurality of sub-sectors wherein each sub-sector of the cache line has a size corresponding to a size of an unsectored cache line of a lower level cache;
storing a reference count corresponding to each sub-sector of the upper level cache line;
responsive to determining that an eviction of the cache line of the upper level cache is to be performed, identifying select sub-sectors to store in the lower level cache based on the reference count associated with each sub-sector of the upper level cache line; and
storing the selected sub-sectors in the lower level cache.

9. The method of claim 8, wherein identifying select sub-sectors comprises determining whether the stored reference count for a select sub-sector exceeds a threshold value.

10. The method of claim 8, further comprising:
responsive to identifying a cache miss in the upper level cache, determining whether requested data resides in the lower level cache; and
responsive to determining that the requested data resides in the lower level cache, storing at least one cache line of the requested data of the lower level cache in a sub-sector of a cache line of the upper level cache.

11. The method of claim 8, further comprising invalidating unselected sub-sectors of the evicted cache line.

12. A method for data processing in a data processing system, comprising:
determining whether an eviction of a cache line from an upper level cache to a lower level cache is to be performed, wherein the upper level cache comprises a plurality of cache lines each being sectored into a plurality of sub-sectors, and wherein the lower level cache comprises a plurality of cache lines each being unsectored, each sub-sector having a size equal to or less than a size of the cache line of the lower level cache;
responsive to determining that an eviction is to be performed, identifying sub-sectors of the cache line to be evicted;
determining a reference count for the identified sub-sectors, the reference count indicating a quantity of references to the respective sub-sector;
comparing the reference counts to a threshold value;
invalidating the sub-sectors having a reference count being below the threshold value; and
storing the sub-sectors having a reference count meeting or exceeding the threshold value in the lower level cache.

* * * * *